DAVID S. GREY
INVENTOR.

BY Frank P. Parker
ATTORNEY

United States Patent Office 3,551,031
Patented Dec. 29, 1970

3,551,031
HIGH MAGNIFICATION HIGH RESOLUTION PROJECTION LENS
David S. Grey, Lexington, Mass., assignor to Bausch & Lomb Incorporated, Rochester, N.Y., a corporation of New York
Filed July 2, 1969, Ser. No. 838,596
Int. Cl. G02b 9/64
U.S. Cl. 350—214                                    5 Claims

ABSTRACT OF THE DISCLOSURE

A high magnification projection lens of substantially 150× having a large relative aperture of substantially $f/1.2$, said lens possessing a high resolution and being substantially diffraction limited particularly at a specified wavelength of the transmitted light, the tangential and sagittal distortion being particularly well corrected as well as less susceptible to the effects of lens tilt.

BACKGROUND OF THE INVENTION

In the design of optical systems and projection lenses in particular having a short conjugate and high resolution, it is necessary that the individual lens elements be extraordinarily well optically centered and free from tilt. Even small departures from perfect optical alignment with regards to both tilt and centration of the lens elements results in added difficulties in achieving a satisfactorily high resolution.

High resolution can be achieved partly by excellent optical alignment and partly by such lens qualities inter alia as superior astigmatic and chromatic as well as comatic conditions.

SUMMARY OF THE INVENTION

The present invention relates to optical systems having a very short conjugate and more particularly relates to a projection system characterized by a high resolution for advantageous use in microfiche viewing apparatus and the like.

Accordingly, it is an object of the present invention to provide a short conjugate type of projection lens having a superior high resolution.

It is a further object to provide such a device which is not critically sensitive to small amounts of lens tilt and lack of centration.

A further object is to provide such a device wherein the above qualities are achieved along with an excellent state of correction of lens aberrations such as tangential and sagittal astigmatism, chromatic and comatic errors, the design being remarkably free of off-axis asymmetry error and flare as evidenced by almost complete absence of phase shift in the computed tangential optical tranfer function (OTF) at the extreme position in the format.

Further objects and advantages will be found in the combination and construction of the details of the invention as set forth in the specification herebelow taken with the accompanying drawings.

DESCRIPTION OF ONE FORM OF INVENTION

All of the forms of optical systems covered by the present patent application are intended to be used in viewing microfiche transparencies and the like and the systems are all characterized by relatively high resolution at least as good as 5 lines per millimeter in the projected image and the magnification is 150 times with a relative aperture of substantially $f/1.2$.

Figure 1:
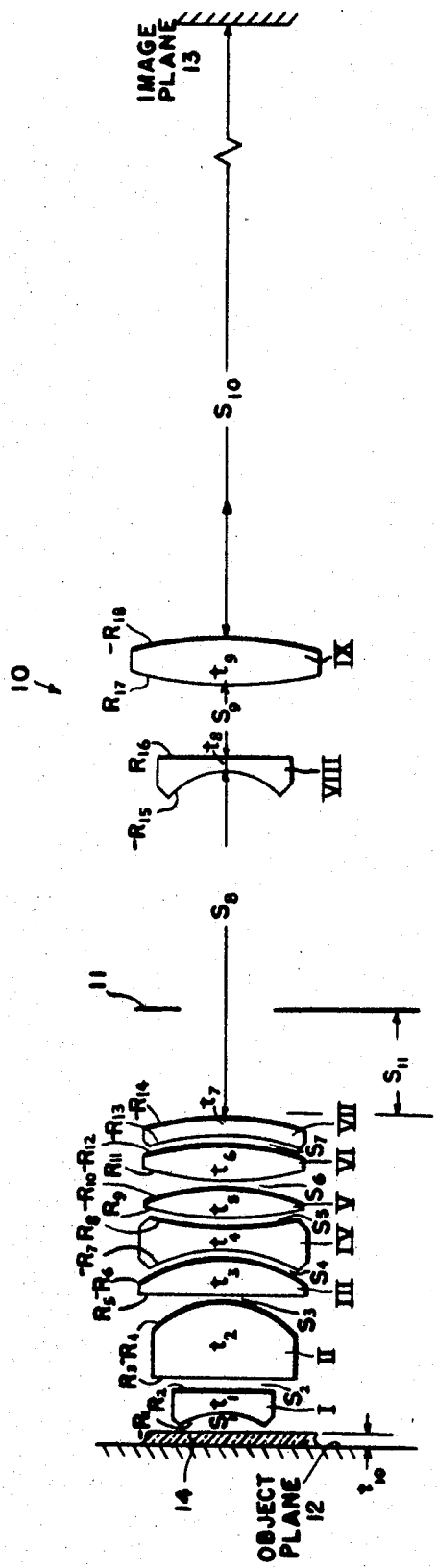
FIG. 1 is an optical diagram showing a preferred form of the invention.

The preferred form of the invention is shown in FIG. 1 and numeral 10 generally indicates the optical system comprising a concave plano lens element designated I which is spaced axially at a distance designated $S_1$ away from a cover plate 14 lying in contact with an object surface 12 to be viewed, said lens having a concave surface designated $-R_1$ facing the entrant light and a rear surface designated $R_2$ which are separated from each other by a distance designated $t_1$. The use of the minus (—) sign along with certain R values means that the center of curvature of such a lens surface lies on the object side of said surface.

All of the lens elements in this form of the invention are singlets and the second singlet is designated II. The second lens is spaced rearwardly from lens I by an axial distance designated $S_2$, the entrant surface being plano and being designated $R_3$. The rear surface of lens II is a convex surface designated $-R_4$ and it is separated from the front surface $R_3$ by an axial distance $t_2$. Spaced at an axial distance $S_3$ rearwardly from lens II is a double convex lens designated III having a front or entrant surface which is convex and is designated $R_5$. The rear surface of lens III is convex and is designated $-R_6$ and it is separated from the front surface thereof by an axial distance $t_3$.

Spaced at an axial distance designated $S_4$ rearwardly from lens III is a double concave lens which is designated IV and has formed on the front side thereof a concave surface which is designated $-R_7$. Separated therefrom by an axial distance $t_4$ is a concave rear lens surface which is designated $R_8$. At an axial distance designated $S_5$ rearwardly of lens IV is a second double convex lens member which is designated V, the front surface thereof being convex and being designated $R_9$. At a distance designated $t_5$ axially rearwardly of the front surface is formed a rear convex surface which is designated $-R_{10}$. Spaced at an axial distance designated $S_6$ rearwardly of lens V is a third double convex lens member which is designated VI and a front convex surface is formed thereon which is designated $R_{11}$. The rear surface of lens VI is convex and is designated $-R_{12}$ and it is separated from the front surface $R_{11}$ by an axial distance designated $t_6$. Rearwardly of lens VI is spaced a meniscus negative lens member designated VII, the axial distance between the two lenses being designated $S_7$ and the front surface thereof being concave and being designated $-R_{13}$. At an axial distance $t_7$ rearwardly of the front surface is formed a convex lens surface which is designated $-R_{14}$.

Lenses I to VII are compact and closely spaced near each other, and rearwardly of the front group is spaced a second concave plano lens which is designated VIII at an axial distance therefrom which is designated $S_8$. Furthermore, in the space $S_8$ is placed an aperture diaphragm which is designated 11 at a distance which is designated $S_{11}$ rearwardly of the lens surface $-R_{14}$. Lens VIII is characterized by a front concave entrance surface which is designated $-R_{15}$ and by a plano rear surface $R_{16}$, said surfaces being separated from each other by an axial distance designated $t_8$.

Spaced rearwardly from lens VIII at an axial distance $S_9$ is a double convex lens member which is designated IX and is characterized by a front convex surface which is designated $R_{17}$ and a rear convex surface which is designated $-R_{18}$ and these surfaces are separated from each other by an axial distance which is designated $t_9$.

The above described lens system 10, it will be noted, has a front working distance sufficiently large to permit use of a relatively thick cover glass 14 which constitutes a unique and difficult requirement when coupled with the requirement of providing a very high resolution and high magnification. Correspondingly, the axial distance $S_{10}$ between the lens surface $-R_{18}$ and the image plane 13 must be large to permit introduction of auxiliary optical equipment such as mirrors and the like whereby the usefulness of the lens system is extended.

In both of the disclosed specific forms of the present invention, the cover plate 14 of FIG. 1 has a constant thickness designated $t_{10}$ which is substantially .507F where F represents the equivalent focal length of the projection lens system 10.

Figure 2:
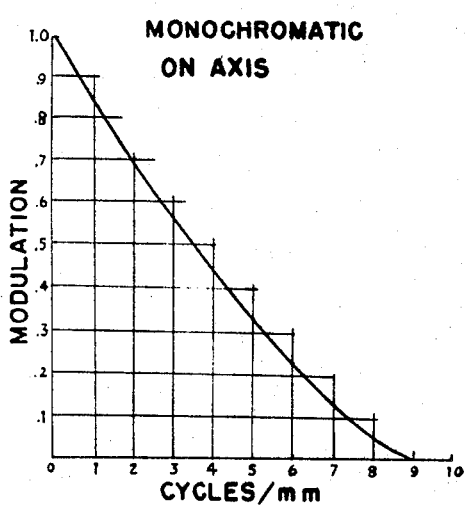
FIG. 2 is a graph showing the monochromatic modulation transfer functions on axis, as related to one form of the optical system shown in FIG. 1.
Figure 3:
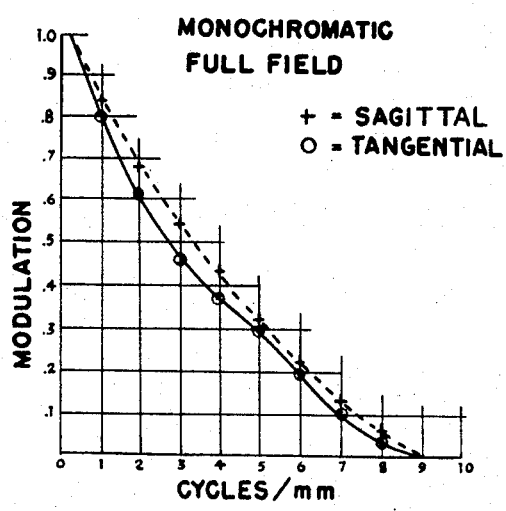
FIG. 3 is a graph similar to FIG. 2 showing said function for full field.

FIGS. 2 and 3 illustrate graphically the modulation transfer function of the lens system in D light at the long conjugate image plane. It is apparent from these graphs that the image contrast at full field is essentially the same as that on axis in the sagittal fan and is only slightly lower in the tangential fan.

Generically a projection lens 10 which satisfies the objects of the present invention may be provided by the use of the following ranges of values of the constructional data given in the Table I herebelow wherein F designates the equivalent focal length of the lens, $-R_1$ to $-R_{18}$ designate the curvature of the successive refractive surfaces on the successive singlet lens components which are numbered I to IX in the direction of entrant light, $t_1$ to $t_9$ represent the axial thicknesses of said lens components, $S_1$ to $S_{10}$ represent the successive axial airspaces between the object and image surfaces which are related to said lens, and $n_D$ and $\nu$ represent the refractive index and Abbe number of the glass used in said lens components,

TABLE I $1.96F < -R_1 < 2.04F$
$R_2 > \pm 20.0F$
$R_3 > \pm 20.0F$
$1.60F < -R_4 < 1.67F$
$43.13F < R_5 < 153.83F$
$2.32F < -R_6 < 2.48F$
$2.24F < -R_7 < 2.48F$
$4.85F < R_8 < 6.24F$
$5.27F < R_9 < 7.26F$
$3.96F < -R_{10} < 4.95F$
$4.28F < R_{11} < 4.55F$
$7.60F < -R_{12} < 8.40F$
$4.51F < -R_{13} < 4.71F$
$7.94F < -R_{14} < 11.86F$
$1.22F < -R_{15} < 1.28F$
$R_{16} > \pm 20.0F$
$18.04F < R_{17} < 20.63F$
$9.48F < -R_{18} < 10.62F$
$.45F < t_1 < .50F$
$1.03F < t_2 < 1.22F$
$.565F < t_3 < .594F$
$.245F < t_4 < .255F$
$.395F < t_5 < .413F$
$.413F < t_6 < .450F$
$.245F < t_7 < .256F$
$.144F < t_8 < .152F$
$.675F < t_9 < .675F$
$.184F < S_1 < .193F$
$.107F < S_2 < .643F$
$.010F < S_3 < .011F$

TABLE I—Continued $.051F < S_4 < .120F$
$.107F < S_5 < .113F$
$.001F < S_6 < .015F$
$.038F < S_7 < .073F$
$4.98F < S_8 < 5.21F$
$.97F < S_9 < 1.11F$
$135.0F < S_{10} < 146.0F$
$1.718 < n_D(I) < 1.722$
$1.689 < n_D(II) < 1.693$
$1.689 < n_D(III) < 1.693$
$1.718 < n_D(IV) < 1.722$
$1.689 < n_D(V) < 1.693$
$1.689 < n_D(VI) < 1.693$
$1.718 < n_D(VII) < 1.722$
$1.515 < n_D(VIII) < 1.518$
$1.718 < n_D(IX) < 1.722$
$28.0 < \nu(I) < 31.0$
$52.0 < \nu(II) < 57.0$
$52.0 < \nu(III) < 57.0$
$28.0 < \nu(IV) < 31.0$
$52.0 < \nu(V) < 57.0$
$52.0 < \nu(VI) < 57.0$
$28.0 < \nu(VII) < 31.0$
$62.0 < \nu(VIII) < 67.0$
$28.0 < \nu(IX) < 31.0$ For one successful form of the projection lens 10, the constructional data is found by computation and experiment to have values as specified in Table II herebelow wherein the designations are the same as above described

TABLE II $-R_1 = 2.000F$
$R_2 = $ Plano
$R_3 = $ Plano
$-R_4 = 1.637F$
$R_5 = 44.011$
$-R_6 = 2.432F$
$R_7 = 2.432F$
$R_8 = 4.958F$
$R_9 = 5.384F$
$R_{10} = 4.853F$
$R_{11} = 4.464F$
$-R_{12} = 8.233F$
$-R_{13} = 4.621F$
$-R_{14} = 8.105F$
$-R_{15} = 1.251F$
$R_{16} = $ Plano
$R_{17} = 20.218F$
$-R_{18} = 9.676F$
$S_1 = .188F$
$S_2 = .109F$
$S_3 = .011F$
$S_4 = .053F$
$S_5 = .110F$
$S_6 = .015F$
$S_7 = .072F$
$S_8 = 5.104F$
$S_9 = .997F$
$S_{10} = 143.3F$
$t_1 = .462F$
$t_2 = 1.196F$
$t_3 = .584F$
$t_4 = .250F$
$t_5 = .405F$
$t_6 = .423F$
$t_7 = .251F$
$t_8 = .149F$
$t_9 = .677F$
$n_D(I) = 1.720$
$n_D(II) = 1.691$
$n_D(III) = 1.691$
$n_D(IV) = 1.720$
$n_D(V) = 1.691$

TABLE II—Continued $n_D(VI) = 1.691$
$n_D(VII) = 1.720$
$n_D(VIII) = 1.517$
$n_D(IX) = 1.720$
$\nu(I) = 29.3$
$\nu(II) = 54.8$
$\nu(III) = 54.8$
$\nu(IV) = 29.3$
$\nu(V) = 54.8$
$\nu(VI) = 54.8$
$\nu(VII) = 29.3$
$\nu(VIII) = 64.5$
$\nu(IX) = 29.3$ Another form of the projection lens 10 is mathematically described and specified by the constructional data given in Table III herebelow wherein the designations are the same as above given,

TABLE III $-R_1 = 2.013F$
$R_2 = \text{Plano}$
$R_3 = \text{Plano}$
$-R_4 = 1.640F$
$R_5 = 150.815F$
$-R_6 = 2.377F$
$-R_7 = 2.288F$
$R_8 = 6.119F$
$R_9 = 7.120F$
$-R_{10} = 4.041F$
$R_{11} = 4.373F$
$-R_{12} = 7.754F$
$-R_{13} = 4.600F$
$-R_{14} = 11.631F$
$-R_{15} = 1.240F$
$R_{16} = \text{Plano}$
$R_{17} = 18.407F$
$-R_{18} = 10.309F$
$S_1 = .189F$
$S_2 = .630F$
$S_3 = .010F$
$S_4 = .117F$
$S_5 = .111F$
$S_6 = .001F$
$S_7 = .039F$
$S_8 = 5.088F$
$S_9 = 1.083F$
$S_{10} = 138.67F$
$t_1 = .500F$
$t_2 = 1.054F$
$t_3 = .577F$
$t_4 = .250F$
$t_5 = .404F$
$t_6 = .441F$
$t_7 = .250F$
$t_8 = .149F$
$t_9 = .677F$
$n_D(I) = 1.720$
$n_D(II) = 1.691$
$n_D(III) = 1.691$
$n_D(IV) = 1.720$
$n_D(V) = 1.691$
$n_D(VI) = 1.691$
$n_D(VII) = 1.720$
$n_D(VIII) = 1.5167$
$n_D(IX) = 1.720$
$\nu(I) = 29.3$
$\nu(II) = 54.8$
$\nu(III) = 54.8$
$\nu(IV) = 29.3$
$\nu(V) = 54.8$
$\nu(VI) = 54.8$
$\nu(VII) = 29.3$
$\nu(VIII) = 64.2$
$\nu(IX) = 29.3$ Specific examples in dimensions of millimeters can be computed from the above Tables II and III by substituting a value of 6.17 mm. for F in each table.

Figure 4:
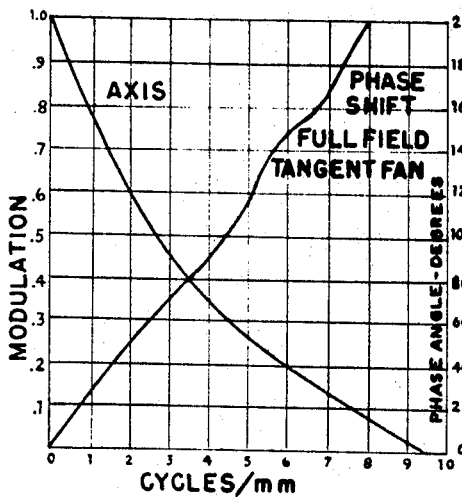
FIG. 4 is another graph showing the modulation transfer functions similar to FIG. 2 and phase shift for another form of said optical system.
Figure 5:
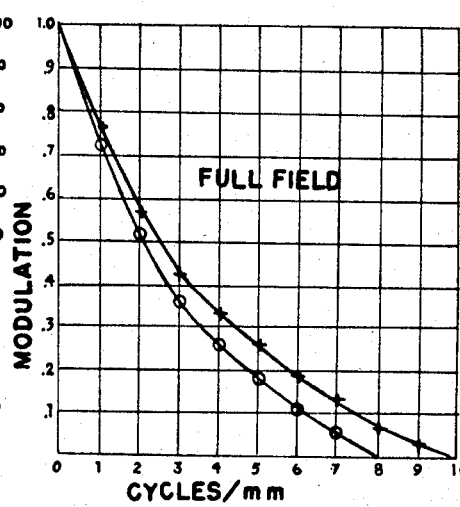
FIG. 5 is still another graph similar to FIG. 3 relating to a second form of the invention.

It will be perceived from the foregoing that the present invention provides a short conjugate projection lens of 150× magnification which is not subject to deleterious effects of ordinary manufacturing lens tilt by reason of the relatively low curvatures of substantially all of the component lens members, the lens nevertheless being capable of extraordinarily high grade performance because of the thorough correction of the usual lens aberrations in addition to the improvement in off-axis asymmetry error and flare. The cumulative beneficial effect or result of the above mentioned corrections together with said low curvatures of the lens surfaces is plotted in the graph shown in FIG. 4 wherein modulation is plotted against cycles per millimeter and also in the graph shown in FIG. 5 which corresponds generally to FIG. 3.

Although only certain forms of the invention have been shown and described in detail, other forms are possible and changes may be made in the details of construction without departing from the spirit of the invention as defined in the claims herebelow.

I claim:

1. A projection lens having substantially a 150× magnification and a high resolution and a numerical aperture of substantially $f/1.2$ and having ranges of values of the constructional data as given in the table herebelow wherein F represents the equivalent focal length of said lens, the curvature of the successive refractive surfaces numbering from the object side being represented by $-R_1$ to $-R_{18}$ and the minus (—) sign used therewith means that the centers of such curvatures lie on the object side of said surfaces, $t_1$ to $t_9$ represent the axial thickness of nine successive singlet lens elements which are numbered I to IX and whereon said refractive surfaces are formed, $S_1$ to $S_{10}$ represent the successive axial airspaces between the object and image surfaces, and $n_D$ and $\nu$ represent the refractive index and Abbe numbers respectively of the glasses used in said elements, $.196F < -R_1 < 2.04F$
$1.60F < R_2 > \pm 20.0F$
$43.13F < R_3 > \pm 20.0F$
$2.32F < -R_4 < 1.67F$
$2.24F < R_5 < 153.83F$
$4.85F < -R_6 < 2.48F$
$5.27F < -R_7 < 2.48F$
$3.96F < R_8 < 6.24F$
$4.28F < R_9 < 7.26F$
$7.60F < -R_{10} < 4.95F$
$4.51F < R_{11} < 4.55F$
$7.94F < -R_{12} < 8.40F$
$1.22F < -R_{13} < 4.71F$
$18.04F < -R_{14} < 11.86F$
$9.48F < -R_{15} < 1.28F$
$.45F < R_{16} > \pm 20.0F$
$1.03F < R_{17} < 20.63F$
$.565F < -R_{18} < 10.62F$
$.245F < t_1 < .50F$
$.395F < t_2 < 1.22F$
$.413F < t_3 < .594F$
$.245F < t_4 < .255F$
$.144F < t_5 < .413F$
$.675F < t_6 < .450F$
$.184F < t_7 < .256F$
$.107F < t_8 < .152F$
$.010F < t_9 < .678F$
$.051F < S_1 < .193F$
$.107F < S_2 < .643F$
$.001F < S_3 < .011F$
$.038F < S_4 < .120F$
$4.98F < S_5 < .113F$ $.97F < S_6 < .015F$
$135.0F < S_7 < .073F$
$1.718 < S_8 < 5.21F$
$1.689 < S_{10} < 146.0F$
$1.689 < n_D(I) < 1.722$
$1.718 < n_D(II) < 1.693$
$1.689 < n_D(III) < 1.693$
$1.689 < n_D(IV) < 1.722$
$1.718 < n_D(V) < 1.693$
$1.515 < n_D(VI) < 1.693$
$1.718 < n_D(VII) < 1.722$
$28.0 < n_D(VIII) < 1.518$
$52.0 < n_D(IX) < 1.722$
$52.0 < \nu(I) < 31.0$
$28.0 < \nu(II) < 57.0$
$52.0 < \nu(III) < 57.0$
$52.0 < \nu(IV) < 31.0$
$28.0 < \nu(V) < 57.0$
$62.0 < \nu(VI) < 57.0$
$28.0 < \nu(VII) < 31.0$
$\nu(VIII) < 67.0$
$\nu(IX) < 31.0$ 2. A high magnification projection lens of substantially 150× and having a large relative aperture at least as great as f/1.2 and a high resolution, said lens being composed of nine singlet components spaced from each other in optical alignment along an optical axis and designated successively I to IX, the constructional data thereof being set forth in the following table wherein $-R_1$ to $-R_{18}$ designate the radii of curvature of the successive refraction surfaces and the minus (—) sign used therewith signifies that the center of curvature of such surface lies on the object side of the apex of said surfaces, $S_1$ to $S_{10}$ designate the successive axial spaces numbering from the object on which said lens is focused, $t_1$ to $t_9$ designate the axial thicknesses of said components I to IX respectively, and $n_D$ and $\nu$ represent the refractive index and the Abbe number respectively of the glasses used in said components successively, $-R_1 = 2.013F$
$R_2 = \text{Plano}$
$R_3 = \text{Plano}$
$-R_4 = 1.640F$
$R_5 = 150.815F$
$-R_6 = 2.377F$
$-R_6 = 2.288F$
$R_8 = 6.119F$
$R_9 = 7.120F$
$-R_{10} = 4.041F$
$R_{11} = 4.373F$
$-R_{12} = 7.754F$
$-R_{13} = 4.600F$
$-R_{14} = 11.631F$
$-R_{15} = 1.240F$
$R_{16} = \text{Plano}$
$R_{17} = 18.407F$
$-R_{18} = 10.309F$
$S_1 = .189F$
$S_2 = .630F$
$S_3 = .010F$
$S_4 = .117F$
$S_5 = .111F$
$S_6 = .001F$
$S_7 = .039F$
$S_8 = 5.088F$
$S_9 = 1.083F$
$S_{10} = 138.67F$
$t_1 = .500F$
$t_2 = 1.054F$
$t_3 = .577F$
$t_4 = .250F$
$t_5 = .404F$
$t_6 = .441F$
$t_7 = .250F$ $t_8 = .149F$
$t_9 = .677F$
$n_D(I) = 1.720$
$n_D(II) = 1.691$
$n_D(III) = 1.691$
$n_D(IV) = 1.720$
$n_D(V) = 1.691$
$n_D(VI) = 1.691$
$n_D(VII) = 1.720$
$n_D(VIII) = 1.5167$
$n_D(IX) = 1.720$
$\nu(I) = 29.3$
$\nu(II) = 54.8$
$\nu(III) = 54.8$
$\nu(IV) = 29.3$
$\nu(V) = 54.8$
$\nu(VI) = 54.8$
$\nu(VII) = 29.3$
$\nu(VIII) = 64.2$
$\nu(IX) = 29.3$ 3. A high magnification projection lens of substantially 150× and having a large relative aperture at least as great as f/1.2 and a high resolution, said lens being composed of nine singlet components spaced from each other in optical alignment along an optical axis and designated successively I to IX, the constructional data thereof being set forth in the following table wherein $-R_1$ to $-R_{18}$ designate the radii of curvature of the successive refractive surfaces and the minus (—) sign used therewith signifies that the center of curvature of such surfaces lies on the object side of the apex of said surfaces, $S_1$ to $S_{10}$ designate the successive axial spaces numbering from the object on which said lens is focused, $t_1$ to $t_9$ designate the axial thicknesses of said components I to IX respectively, and $n_D$ and $\nu$ represent the refractive index and the Abbe number respectively of the glasses used in said components successively, $-R_1 = 2.000F$
$R_2 = \text{Plano}$
$R_3 = \text{Plano}$
$-R_4 = 1.637F$
$R_5 = 44.011F$
$-R_6 = 2.432F$
$R_7 = .432F$
$R_8 = 4.958F$
$R_9 = 5.384F$
$R_{10} = 4.853F$
$R_{11} = 4.464F$
$-R_{12} = 8.233F$
$-R_{13} = 4.621F$
$-R_{14} = 8.105F$
$-R_{15} = 1.251F$
$R_{16} = \text{Plano}$
$R_{17} = 20.218F$
$-R_{18} = 9.676F$
$S_1 = .188F$
$S_2 = .109F$
$S_3 = .011F$
$S_4 = .053F$
$S_5 = .110F$
$S_6 = .015F$
$S_7 = .072F$
$S_8 = 5.104F$
$S_9 = .997F$
$S_{10} = 143.3F$
$t_1 = .462F$
$t_2 = 1.196F$
$t_3 = .584F$
$t_4 = .250F$
$t_5 = .405F$
$t_6 = .423F$
$t_7 = .251F$
$t_8 = .149F$
$t_9 = .677F$ $n_D(I) = 1.720$
$n_D(II) = 1.691$
$n_D(III) = 1.691$
$n_D(IV) = 1.720$
$n_D(V) = 1.691$
$n_D(VI) = 1.691$
$n_D(VII) = 1.720$
$n_D(VIII) = 1.517$
$n_D(IX) = 1.720$
$\nu(I) = 29.3$
$\nu(II) = 54.8$
$\nu(III) = 54.8$
$\nu(IV) = 29.3$
$\nu(V) = 54.8$
$\nu(VI) = 54.8$
$\nu(VII) = 29.3$
$\nu(VIII) = 64.5$
$\nu(IX) = 29.3$ 4. A high magnification projection lens of substantially 150× and having a large relative aperture at least as great as $f/1.2$ and a high resolution, said lens being composed of nine singlet components spaced from each other in optical alignment along an optical axis and designated successively I to IX, the constructional data thereof being set forth specifically in the following table wherein $-R_1$ to $-R_{18}$ designate the radii of curvature of the successive refractive surfaces and the minus (—) sign used therewith signifies that the center of curvature of such surfaces lies on the object side of the apex of said surfaces, $S_1$ to $S_{10}$ designate the successive axial spaces numbering from the object on which the lens is focused, $t_1$ to $t_9$ designate the axial thicknesses of said components I to IX respectively, and $n_D$ and $\nu$ represent the refractive index and the Abbe number respectively of the glass used in said components successively, SCALAR VALUES IN m/m.
E.F.L.=6.17   Magnification=150×   N.A.=f/1.2

| Lens | Curvatures | Thicknesses | Spaces | $n_D$ | $\nu$ |
|---|---|---|---|---|---|
| I | $-R_1=12.341$ $R_2=$Plano | $t_1=2.848$ | $S_1=1.16$ | 1.720 | 29.3 |
| II | $R_3=$Plano $-R_4=10.102$ | $t_2=7.381$ | $S_2=0.671$ | 1.691 | 54.8 |
| III | $R_5=271.550$ $-R_6=15.004$ | $t_3=3.604$ | $S_3=.067$ | 1.691 | 54.8 |
| IV | $-R_7=15.004$ $R_8=30.589$ | $t_4=1.544$ | $S_4=.325$ | 1.720 | 29.3 |
| V | $R_9=33.218$ $-R_{10}=29.943$ | $t_5=2.50$ | $S_5=.678$ | 1.691 | 54.8 |
| VI | $R_{11}=27.542$ $-R_{12}=50.798$ | $t_6=2.608$ | $S_6=.092$ | 1.691 | 54.8 |
| VII | $-R_{13}=28.514$ $-R_{14}=50.010$ | $t_7=1.55$ | $S_7=.443$ | 1.720 | 29.3 |
| VIII | $-R_{15}=7.720$ $R_{16}=$Plano | $t_8=.92$ | $S_8=31.494$ | 1.517 | 64.5 |
| IX | $R_{17}=124.748$ $-R_{18}=59.702$ | $t_9=4.177$ | $S_9=6.15$ $S_{10}=884.3$ | 1.720 | 29.3 |

5. A high magnification projection lens of substantially 150× and having a large relative aperture at least as great as $f/1.2$ and a high resolution, said lens being composed of nine singlet components spaced from each other in optical alignment along an optical axis and designated successively I to IX, the constructional data thereof being set forth specifically in the following table wherein $-R_1$ to $-R_{18}$ designate the radii of curvature of the successive refractive surfaces and the minus (—) sign used therewith signifies that the center of curvature of such surfaces lies on the object side of the apex of said surfaces, $S_1$ to $S_{10}$ designate the successive axial spaces numbering from the object on which said lens is focused, $t_1$ to $t_9$ designate the axial thicknesses of said components I to IX respectively, and $n_D$ and $\nu$ represent the refractive index and the Abbe number respectively of the glasses used in said components successively, SCALAR VALUES IN m/m.
E.F.L.=6.17   Magnification=150×   N.A.=f/1.2

| Lens | Curvatures | Thickness | Spaces | $N_D$ | $\nu$ |
|---|---|---|---|---|---|
| I | $-R_1=12.132$ $R_2=$Plano | $t_1=3.013$ | $S_1=1.14$ | 1.720 | 29.3 |
| II | $R_3=$Plano $-R_4=9.887$ | $t_2=6.352$ | $S_2=3.798$ | 1.691 | 54.8 |
| III | $R_5=908.959$ $-R_6=14.327$ | $t_3=3.476$ | $S_3=.060$ | 1.691 | 54.8 |
| IV | $-R_7=13.787$ $R_8=36.881$ | $t_4=1.507$ | $S_4=.707$ | 1.720 | 29.3 |
| V | $R_9=42.911$ $-R_{10}=24.354$ | $t_5=2.434$ | $S_5=.669$ | 1.691 | 54.8 |
| VI | $R_{11}=26.354$ $-R_{12}=46.731$ | $t_6=2.658$ | $S_6=.006$ | 1.691 | 54.8 |
| VII | $-R_{13}=27.725$ $-R_{14}=70.102$ | $t_7=1.507$ | $S_7=.235$ | 1.720 | 29.3 |
| VIII | $-R_{15}=7.473$ $R_{16}=$Plano | $t_8=.896$ | $S_8=30.668$ | 1.5167 | 64.2 |
| IX | $R_{16}=110.938$ $-R_{18}=62.130$ | $t_9=4.079$ | $S_9=6.529$ $S_{10}=835.7$ | 1.720 | 29.3 |

References Cited

UNITED STATES PATENTS 3,437,403   4/1969   Bird _____ 350—214X

JOHN K. CORBIN, Primary Examiner

UNITED STATES PATENT OFFICE
CERTIFICATE OF CORRECTION

Patent No. 3,551,031         Dated    December 29, 1970

Inventor(s) David S. Grey

It is certified that error appears in the above-identified patent and that said Letters Patent are hereby corrected as shown below:

Col. 6, line 44, change ".196F" to -- 1.96F --; line 45, dele "1.60F< "; line 46, delete "43.13F< "; line 47, change "2.32F to -- 1.60F --; line 48, change "2.24F" to -- 43.13F --; line 49, change "4.85F" to -- 2.32F --; line 50, change "5.27F to -- 2.24F --; line 51, change "3.96F" to -- 4.85F --; line 52, change "4.28F" to -- 5.27F --; line 53, change "7.60F to -- 3.96F --; line 54, change "4.51F" to -- 4.28F --; line 55, change "7.94F" to -- 7.60F --; line 56, change "1.22F to -- 4.51F --; line 57, change "18.04F" to -- 7.94F --; line 58, change "9.48F" to -- 1.22F --; line 59, delete ".45F< line 60, change "1.03F" to -- 18.04F --; line 61, change ".565F to -- 9.48F --; line 62, change ".245F" to -- .45F --; line 6 change ".395F" to -- 1.03F --; line 64, change ".413F" to -- .565F --; line 66, change ".144F" to -- .395F --; line 67, change ".675F" to -- .413F --; line 68, change ".184F" to -- .245F --; line 69, change ".107F" to -- .144F --; line 70, change ".010F" to -- .675F --; line 71, change ".051F" to -- .184F --; line 73, change ".001F" to -- .010F --; line 74, change ".038F" to -- .051F --; line 75, change "4.98F" to -- .107F --;

Col. 7, line 1, change ".97F" to -- .001F --; line 2, change "13 to -- .038F --; line 3, change "1.718" to -- 4.98F --; betwee lines 3-4 insert ".97F < $S_0$ < 1.11F"; line 4, change "1.689" t -- 135.0F --; line 5, change "1.689" to -- 1.718 --; line 6, change "1.718" to -- 1.689 --; line 8, change "1.689" to -- 1.718 --; line 9, change "1.718" to -- 1.689 --; line 10, change "1.515" to -- 1.689 --; line 12, change "28.0" to -- 1.515 --; line 13, change "52.0" to -- 1.718 --; line 14, change "52.0" to -- 28.0 --; line 15, change "28.0" to -- 52. line 17, change "52.0" to -- 28.0 --; line 18, change "28.0" t -- 52.0 --; line 19, change "62.0" to -- 52.0 --;

--CONTINUED---SEE PAGE 2

UNITED STATES PATENT OFFICE
CERTIFICATE OF CORRECTION

Patent No. 3,551,031      Dated December 29, 1970

Inventor(s) David S. Grey

It is certified that error appears in the above-identified patent and that said Letters Patent are hereby corrected as shown below:

-- SHEET #2 --

Col. 7, line 21, insert "$62.0 <$" before -- $\nu$(VIII) --;
line 22, insert "$28.0 <$" before -- $\nu$(IX) --;
line 47, change "$-R_6 = 2.288F$" to -- $-R_7 = 2.288F$ --

Col. 8, line 45, change "$.432F$" to -- $2.432F$ --

Col. 10, in the Table under "Thickness", change "$r_2$" to -- $t_2$ --

Signed and sealed this 29th day of June 1971.

(SEAL)
Attest:

EDWARD M. FLETCHER, JR.
Attesting Officer

WILLIAM E. SCHUYLER, JR.
Commissioner of Patents